May 5, 1959 J. J. PURCELL 2,885,072

PACKAGING MEANS FOR AN ENDLESS TAPE

Filed Sept. 20, 1956 2 Sheets-Sheet 1

*INVENTOR.*
JOSEPH J. PURCELL
*BY* Charles S. [signature]
AGENT

United States Patent Office 2,885,072

Patented May 5, 1959

2,885,072

PACKAGING MEANS FOR AN ENDLESS TAPE

Joseph J. Purcell, Endwell, N.Y., assignor to International Business Machines Corporation, New York, N.Y., a corporation of New York Application September 20, 1956, Serial No. 610,912

5 Claims. (Cl. 206—59)

This invention relates to the packaging means for an endless tape and more particularly to a container for storing and dispensing an endless paper tape.

Inserting an endless tape into, for example, an electric programming device or a time indicating device, requires some skill particularly because of the length of the tape. If during a tape loading operation, the tape should slip out of the hand of the loader and fall to the floor, the tape may become soiled, possibly creased or even torn. Also troubles have arisen in storing and shipping endless tapes because when they were coiled up or wound the looped ends were folded so closely as to set a crease at the folded ends.

The object of the invention is to provide a shipping container for an endless tape which will reduce these hazards.

It is an object of the invention to provide a simple and inexpensive container for storing an endless tape.

A further object of the invention is to provide a retainer for maintaining a tape within the confines of a container and which governs the withdrawal of the tape from the container.

A still further object of the invention is to provide a tape storing container which readily lends itself to the operation of transferring the tape to another storage medium.

With the present invention endless tapes can be stored and shipped in a simple container of cardboard or like material. The container incorporates a retainer element that is operative to retain the tape within the confines of the container and to facilitate and govern the withdrawal of the tape during a tape transferring operation.

Other objects of the invention will be pointed out in the following description and claims and illustrated in the accompanying drawings, which disclose, by way of examples, the principle of the invention and the best mode, which has been contemplated, of applying that principle.

Figure 1:
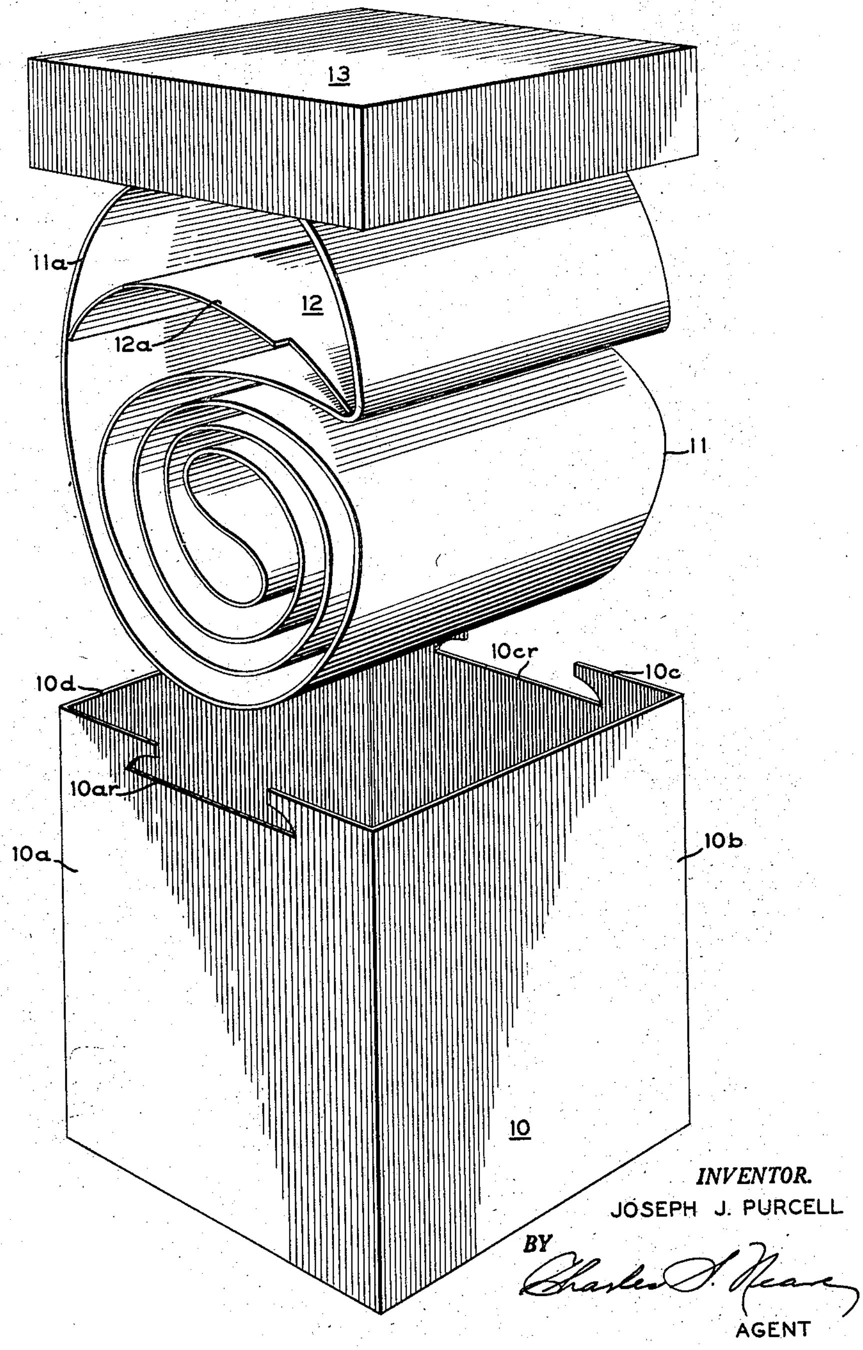
Fig. 1 is a view in perspective of a tape storing container constructed in accordance with the present invention and showing the elements in exploded position.
Figure 2:
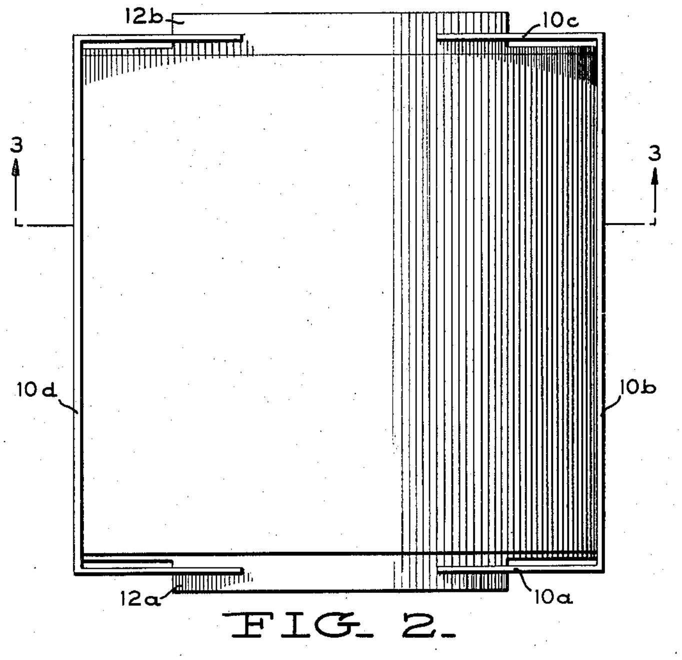
Fig. 2 is a top plan view of a tape storing container with a tape retainer element in position.
Figure 3:
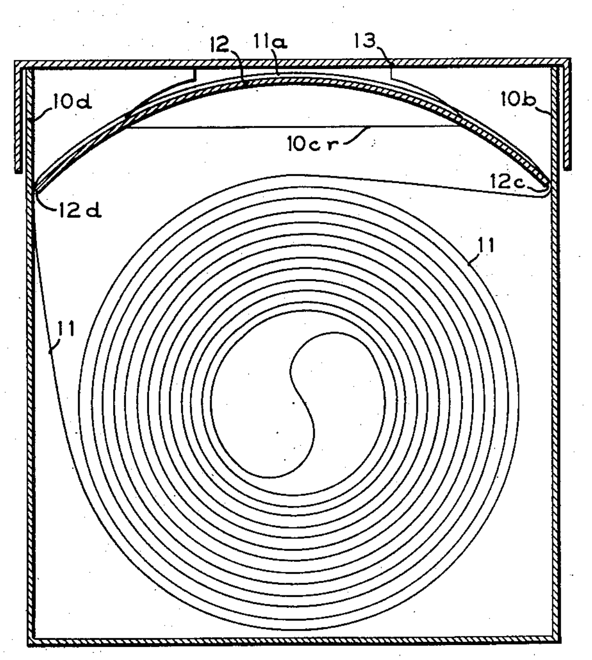
Fig. 3 is a sectional view along the line 3—3 of Fig. 2 showing a tape storing container with a coil of endless tape and a tape retaining element.

Referring to Fig. 1 there is shown a container 10, an endless coil of paper tape 11, a retainer element 12, and a container cover 13. The container 10 of cardboard or similar material has a square bottom surrounded by four sides 10*a*, 10*b*, 10*c* and 10*d* to define a substantially cube-shaped box adapted to store an endless coil of tape 11. The opposite sides 10*a* and 10*c* are provided at the center of their top edge with opposing and like-shaped apertures 10*ar* and 10*cr*, respectively. The apertures 10*ar* and 10*cr* extend inwardly from the top of their respective sides and are narrower at the uppermost portion than at their base, as shown by Figs. 1 and 3. The apertures are adapted to receive tabs of the retainer element 12 as will be further described hereafter.

The tape retainer element 12 is made of cardboard or similar material possessing some flexibility. It has a substantially rectangular shape being appreciably longer than the length and slightly narrower than the width of the opening at the top of the container 10. Tabs 12*a* and 12*b* are provided opposite to each other and at the midpoint of the sides of the retainer element 12 having the greater dimension. Tabs 12*a* and 12*b* are used to secure the retainer element 12 in the apertures 10*ar* and 10*cr* of the sides 10*a* and 10*c* of container 10. The tabs 12*a* and 12*b* are slightly longer than the length of the base of the apertures 10*ar* and 10*cr* so as to assist in bending the retainer element 12 into a curve, as shown in Fig. 3, when placed in position within container 10.

In loading the container the endless tape 11 is wound into a sufficiently small coil to permit its insertion through the top opening of the container 10. The retainer element 12 is bowed and passed transversely through the outermost loop of the tape 11. The tape 11 and retainer element 12 are then inserted into the container 10 with tabs 12*a* and 12*b* of retainer element 12 being inserted into their respective apertures in the sides 10*a* and 10*c* of container 10, as shown in Fig. 3. When the tape 11 has been inserted into the container 10, the natural resiliency of the tape 11 and retainer element 12 tends to locate them within the container 10, substantially as shown in Fig. 3, with the retainer element 12 serving to keep the tape 11 within the confines of the container 10. The pressures are insufficient to cause the innermost looped end of tape 11 to be sharply folded.

A cover 13 telescopes over the open end of the container 10. The cover 13 may be conveniently secured in a closed position by sealing tape or other suitable means for storing and shipping purposes.

A feature of the container 10 resides in the action of the retainer element 12 when tape 11 is being withdrawn. With reference to Fig. 3, it may be noted that the portion of the outermost loop 11*a* of tape 11 as it takes off from the coil of tape and inwraps edge 12*c* of retainer element 12 forms an acute angle about edge 12*c*. The portion of loop 11*a* of tape 11 that takes off from the coil of tape and passes by edge 12*d* of retainer element 12 forms an obtuse angle about edge 12*d*. When it is desired to remove the tape 11, this can be readily performed by catching hold of the outermost loop 11*a* which overlies the retainer element 12. When pulling the tape 11 the force of the pull and the acute angle of the tape about edge 12*c* causes this edge of retainer element 12 to squeeze the tape against the inner wall of side 10*b* such that the tape cannot be removed from this side of container 10, thereby providing a tape locking action. The action at edge 12*d* of retainer element 12 is different due to the obtuse angle of the tape as it passes about edge 12*d* and will permit the passing of the tape 11 between edge 12*d* and the inner wall of said 10*d* as the tape is pulled. The frictional pressure applied by edge 12*d* is sufficient to prevent the tape 11 from being pulled from the container 10 under weight of the container 10 and tape 11 in the event the container 10 is accidentally dropped from the hand while the outermost loop 11*a* is retained.

A further feature resides in the ease with which a tape may be transferred from the container 10 and loaded into another storage medium such as a programming device or the like. For example, in the transfer of tape from the container to a programming device, the container can be suspended by the tape at any time during the transfer operation to permit a two-handed manipulation of tape feeding or other mechanism associated with the programming device without the heretofore attendant danger of releasing the coil of tape for fear of damage to the tape. Furthermore, the container is adapted to be reused for tape storing purposes, if the need arises.

The dimensions of the container 10 are not critical but should be sufficient to supply adequate storage space for the tape that is to be stored therein.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A storage container for a coiled endless tape comprising a container forming a storage chamber and having an open end, a coiled endless tape having an outer end loop, a removable retainer element inserted in the outer end loop of the coil of endless tape, and means for attaching said retainer element to opposite sides of said container adjacent the open end for holding the coil of endless tape within the confines of said container and governing the removal of the endless tape therefrom.

2. A storage container for a coiled endless tape comprising a container having sidewalls forming a storage chamber and having an open end, a coiled endless tape having an outer end loop, a removable retainer element inserted in the outer end loop of the coil of endless tape, and means for attaching said retainer element to a pair of opposite sidewalls of said container adjacent the open end, said retainer element serving to hold the coiled endless tape within said container and to permit the unwinding removal of the endless tape in a continuous strip from within said container.

3. A storage container for a coiled endless tape comprising a container having a bottom, sidewalls and an open end and a pair of undercut apertures centrally disposed in a pair of the opposite sidewalls adjacent the open end, a coiled endless tape having an outer end loop, a removable bowed resilient retainer element inserted in the outer end loop of the coil of endless tape, and a pair of tabs integral with said retainer element and attached within the undercut apertures in the pair of opposite sidewalls of said container, said retainer element serving to hold the coiled endless tape within the confines of said container, one end of said retainer element being arranged to coact with the endless tape and a side of said container to permit the unwinding removal of the endless tape in a continuous strip from within the confines of said container.

4. A storage container for a coiled endless tape comprising a container having a bottom, four sidewalls and an open end, an opposing pair of sidewalls having undercut apertures disposed adjacent the open end of said container, a coiled endless tape having an outer end loop, a removable resilient rectangular-shaped retainer element having a longitudinal dimension appreciably greater than the length of the opening in said container and inserted in the outer end loop of the coil of endless tape, and a pair of tabs integral with said retainer element and flanking the longitudinal edges of the same and inserted in the undercut apertures in the sidewalls of the said container for securing said retainer element in a bowed form within the confines and adjacent the opening in said container, one end of said retainer element being arranged to coact with the endless tape and a sidewall of said container to provide a locking pressure thereat against the removal of the endless tape, the opposite end of said retainer element being arranged to coact with the endless tape and the opposite sidewall of said container during removal of the endless tape to provide a pressure on the same that will permit removal of the endless tape in a continuous strip from said container.

5. A storage container for a coiled endless tape comprising a container having a bottom, four sidewalls and an open end, an opposing pair of said sidewalls having undercut apertures disposed adjacent the open end of said container, a coiled endless tape having an outer end loop, a removable resilient rectangular-shaped retainer element inserted in the outer end loop of the coil of endless tape and having a longitudinal dimension appreciably greater than the length of the opening in said container, and a pair of tabs integral with said retainer element flanking the longitudinal edges of the same and inserted in the undercut apertures in the sidewalls of said container for securing said retainer element in a bowed form within the confines and adjacent the opening in said container, one end of said retainer element being arranged to coact with the endless tape and a sidewall of said container to provide a locking pressure thereat against the removal of the endless tape, the opposite end of said retainer element being arranged to coact with the endless tape and the opposite sidewall of said container during removal of the endless tape to provide a pressure on the endless tape that will permit removal of the endless tape in a continuous strip from said container, the inner loop of said tape being removable from said container after the retainer element has been removed.

References Cited in the file of this patent

UNITED STATES PATENTS

| | | |
|---|---|---|
| 1,165,979 | Knothe | Dec. 28, 1915 |
| 1,498,377 | Honigbaum | June 17, 1924 |
| 1,817,913 | Bellemere | Aug. 11, 1931 |
| 1,836,433 | Batts | Dec. 15, 1931 |
| 2,264,131 | Gershel | Nov. 25, 1941 |
| 2,535,233 | Ross | Dec. 26, 1950 |